(12) United States Patent
Zhao

(10) Patent No.: US 11,184,441 B2
(45) Date of Patent: Nov. 23, 2021

(54) INTERMEDIATE DEVICE, IOT TERMINAL AND METHOD OF IOT TERMINAL ACCESSING IOT PLATFORM

(71) Applicant: BOE TECHNOLOGY GROUP CO., LTD., Beijing (CN)

(72) Inventor: Junjie Zhao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/494,975

(22) PCT Filed: Mar. 25, 2019

(86) PCT No.: PCT/CN2019/079504
§ 371 (c)(1),
(2) Date: Sep. 17, 2019

(87) PCT Pub. No.: WO2019/205856
PCT Pub. Date: Oct. 31, 2019

(65) Prior Publication Data
US 2020/0382596 A1    Dec. 3, 2020

(30) Foreign Application Priority Data

Apr. 26, 2018 (CN) .......................... 201810384046.6

(51) Int. Cl.
*H04W 4/80*    (2018.01)
*H04L 29/08*    (2006.01)
*H04W 76/19*    (2018.01)
*H04W 48/16*    (2009.01)

(52) U.S. Cl.
CPC ............... *H04L 67/12* (2013.01); *H04W 4/80* (2018.02); *H04W 48/16* (2013.01); *H04W 76/19* (2018.02)

(58) Field of Classification Search
CPC .... H04L 67/12; H04L 67/2809; H04W 76/19; H04W 4/80; H04W 48/16
See application file for complete search history.

(56) References Cited

U.S. PATENT DOCUMENTS

2014/0044007 A1    2/2014 Smadi
2014/0244834 A1*   8/2014 Edalia .................... H04W 4/21
                                                       709/224
(Continued)

FOREIGN PATENT DOCUMENTS

| CN | 103713608 A | 4/2014 |
| CN | 104780536 A | 7/2015 |
| CN | 106302056 A | 1/2017 |

(Continued)

OTHER PUBLICATIONS

First Office Action for CN Appl. No. 201810384046.6, dated Aug. 29, 2019.

Primary Examiner — Julio R Perez
(74) Attorney, Agent, or Firm — The Webb Law Firm

(57) ABSTRACT

An intermediate device, an IoT terminal and a method of the IoT terminal accessing the IoT platform are disclosed. The method comprises: acquiring feature information of at least one of the IoT terminal or the intermediate device; determining whether the acquired feature information satisfies a preset condition; deciding, according to the determination, whether the IoT terminal accesses the IoT platform through the intermediate device.

19 Claims, 13 Drawing Sheets

(56) References Cited

U.S. PATENT DOCUMENTS

2016/0353305 A1\* 12/2016 Zakaria ............. H04M 1/72569
2020/0203027 A1\* 6/2020 Gawda ................ H04L 12/2807

FOREIGN PATENT DOCUMENTS

| CN | 106550383 A | 3/2017 |
| CN | 106714081 A | 5/2017 |
| CN | 106973052 A | 7/2017 |
| CN | 108683715 A | 10/2018 |

\* cited by examiner

INTERMEDIATE DEVICE, IOT TERMINAL AND METHOD OF IOT TERMINAL ACCESSING IOT PLATFORM

CROSS REFERENCE TO RELATED APPLICATIONS

The present application is a U.S. National Stage Application under 35 U.S.C. § 371 of International Patent Application No. PCT/CN2019/079504, filed on Mar. 25, 2019, which claims priority to Chinese Patent Application No. 201810384046.6, filed on Apr. 26, 2018, the disclosures of both of which is hereby incorporated by reference in entirety.

TECHNICAL FIELD

The present disclosure relates to an intermediate device, an Internet of things (IoT) terminal and a method of the IoT terminal accessing an IoT platform.

BACKGROUND

IoT as a new generation of information technology is the Internet of things connected. With the development of IoT technology, the IoT terminal has been applied in various industries, such as parking management, water quality monitoring, vehicle operation or the like. More and more IoT terminals have accessed the IoT platform.

The IoT terminal can be connected to the IoT platform through a long-distance communication technology such as GPRS (General Packet Radio Service), NB-IOT (Narrow Band Internet of Things) or the like. Alternatively, the IoT terminal can be connected to the intermediate device (such as a gateway or a mobile phone) through a short-range wireless communication technology such as NFC (near field communication), Bluetooth or the like, and then connected to the IoT platform through the intermediate device.

SUMMARY

An object of the present disclosure is to provide an intermediate device, an IoT terminal and a method of the IoT terminal accessing the IoT platform, thereby improving the reliability of the IoT terminal accessing the IoT platform.

Based on the above object, the present disclosure provides a method of an IoT terminal accessing an IoT platform, comprising:

acquiring feature information of the IoT at least one of terminal or the intermediate device;

determining whether the acquired feature information satisfies a preset condition; and deciding, according to the determination, whether the IoT terminal accesses the IoT platform through the intermediate device.

The feature information comprises at least one of:

power amount information, traffic information, signal strength information, location information, storage space information, processing capability information, signal transmission rate information, or signal transmission stability information.

Acquiring the feature information of at least one of the IoT terminal or the intermediate device and determining whether the acquired feature information satisfies the preset condition may comprise:

acquiring, by the IoT terminal, the feature information of the intermediate device;

determining, by the IoT terminal, whether the feature information of the intermediate device satisfies the preset condition related to the intermediate device.

Alternatively, acquiring the feature information of at least one of the IoT terminal or the intermediate device and determining whether the acquired feature information satisfies the preset condition may comprise:

acquiring, by the IoT terminal, the feature information of the IoT terminal and the feature information of the intermediate device;

determining, by the IoT terminal, whether the feature information of the intermediate device satisfies the preset condition related to the intermediate device, and whether the feature information of the IoT terminal satisfies the preset condition related to the IoT terminal.

Acquiring the feature information of at least one of the IoT terminal or the intermediate device and determining whether the acquired feature information satisfies the preset condition may comprise:

acquiring, by the intermediate device, the feature information of the intermediate device;

determining, by the intermediate device, whether the feature information of the intermediate device satisfies the preset condition related to the intermediate device.

Alternatively, acquiring the feature information of at least one of the IoT terminal or the intermediate device and determining whether the acquired feature information satisfies the preset condition may comprise:

acquiring, by the intermediate device, the feature information of the intermediate device and the feature information of the IoT terminal;

determining, by the intermediate device, whether the feature information of the intermediate device satisfies the preset condition related to the intermediate device, and whether the feature information of the IoT terminal satisfies the preset condition related to the IoT terminal.

The present disclosure further provides an IoT terminal, comprising:

a feature information acquisition circuit configured to acquire feature information of an intermediate device;

a condition determination circuit configured to determine whether the feature information of the intermediate device satisfies a preset condition related to the intermediate device; and an access circuit configured to decide, according to the determination by the condition determination circuit, whether to access an IoT platform through the intermediate device.

The present disclosure further provides an intermediate device, comprising:

a feature information acquisition circuit configured to acquire feature information of the intermediate device after receiving a connection establishment request sent by an IoT terminal;

a condition determination circuit configured to determine whether the feature information of the intermediate device satisfies a preset condition related to the intermediate device; and a connection request response circuit configured to determine, according to the determination by the condition determination circuit, whether to respond to the connection establishment request.

DETAILED DESCRIPTION

Figure 1:
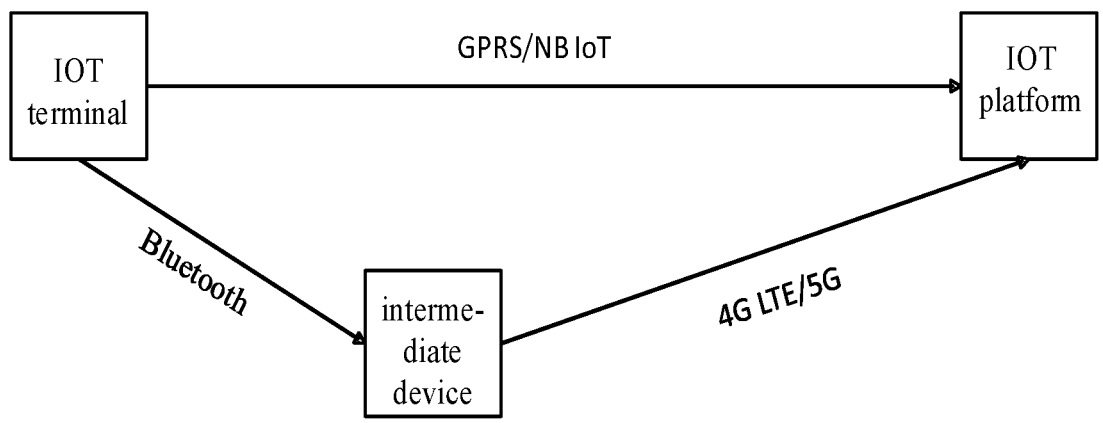
FIG. 1 is a schematic diagram of an IoT terminal accessing an IoT platform through an intermediate device in the prior art.

For a clear understanding of the object of the present disclosure, its technical solution and advantages, the present disclosure will be further described in detail below in conjunction with the accompanying drawings and embodiments.

A detailed description of embodiments of the present disclosure will be given below. Illustrative embodiments are shown in the drawings, in which the similar reference signs are used throughout to represent the same or similar elements or elements having the same or similar functions. The embodiments described with reference to the drawings are illustrative, which are merely intend to interpret the present disclosure, but cannot be understood as limitation to the present disclosure.

Those skilled in the art will understand that the singular forms "a", "an", "said", and "the" may be intended to include the plural forms as well, unless the context clearly indicates otherwise. The term "and/or" includes any or all combinations of one or more of the associated listed items.

It should be noted that all expressions using "first" and "second" in the embodiments of the present disclosure are intended to distinguish between two different entities with the same name or different parameters. It can be seen that "first" and "second" are only for convenience of expression and should not be understood as limiting the embodiments of the present disclosure, which will not be explained in detail in subsequent embodiments.

As shown in FIG. 1, the IoT terminal supports GPRS+Bluetooth, and the intermediate device supports 4G+Bluetooth. When Bluetooth is activated on the intermediate device, the IoT device will preferentially connect to the intermediate device through Bluetooth and connect to the IoT platform through the intermediate device, so as to save traffic or power consumption of the IoT terminal.

However, the inventor of the present disclosure has found that a problem of unreliable connection of the IoT system often occurs in the existing method of an IoT terminal accessing an IoT platform through an intermediary device.

In the technical solution of the present disclosure, by acquiring the feature information of at least one of the IoT terminal or the intermediate device, it is determined whether the acquired feature information satisfies a preset condition, so as to decide, according to the determination, whether the IoT terminal accesses the IoT platform through the intermediate device. In this way, according to the determination, the IoT platform can be accessed selectively through the intermediate device to avoid a communication problem caused by accessing the intermediate device having insufficient power amount, insufficient traffic, weak signal strength, a long distance, insufficient storage space, insufficient processing capability, slow signal transmission, or unstable signal transmission, or to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

By analyzing the existing method of the IoT terminal accessing the IoT platform through the intermediate device, the inventor of the present disclosure has found that the reason for the loss of the IoT terminal is in that, when the IoT platform is accessed by the IoT terminal through the intermediate device, the intermediate device itself may have insufficient power amount, insufficient traffic, weak signal strength, long distance, insufficient storage space, insufficient processing capability, slow signal transmission, or unstable signal transmission or the like, resulting in communication interruption between the IoT terminal and the IoT platform and thus the loss of the IoT terminal.

In view of this, in the technical solution of the present disclosure, by acquiring the feature information of at least one of the IoT terminal or the intermediate device, for example, acquiring the feature information such as power amount, traffic, location, storage space, processing capability, signal transmission rate or signal transmission stability of at least one of the IoT terminal or the intermediate device, it is determined whether the acquired feature information satisfies a preset condition, so as to decide, according to the determination, whether the IoT terminal can access the IoT platform through the intermediate device. In this way, according to the determination, the IoT platform can be accessed selectively through the intermediate device to avoid the communication problem caused by accessing the IoT platform through the intermediate device having insufficient power amount, insufficient traffic, weak signal strength, a long distance, insufficient storage space, insufficient processing capability, slow signal transmission, or unstable signal transmission, thereby improving the reliability of the IoT terminal accessing the IoT platform.

The technical solution of the present disclosure will be described in detail below with reference to the accompanying drawings. The technical solution of the present disclosure provides six embodiments. In the technical solutions of Embodiments 1, 2 and 3, the IoT terminal acquires the feature information and determines whether to access the IoT platform through the intermediate device. In the technical solutions of Embodiments 4, 5 and 6, the intermediate device acquires the feature information and determines whether to access the IoT platform through the intermediate device.

Embodiment 1

Figure 2:
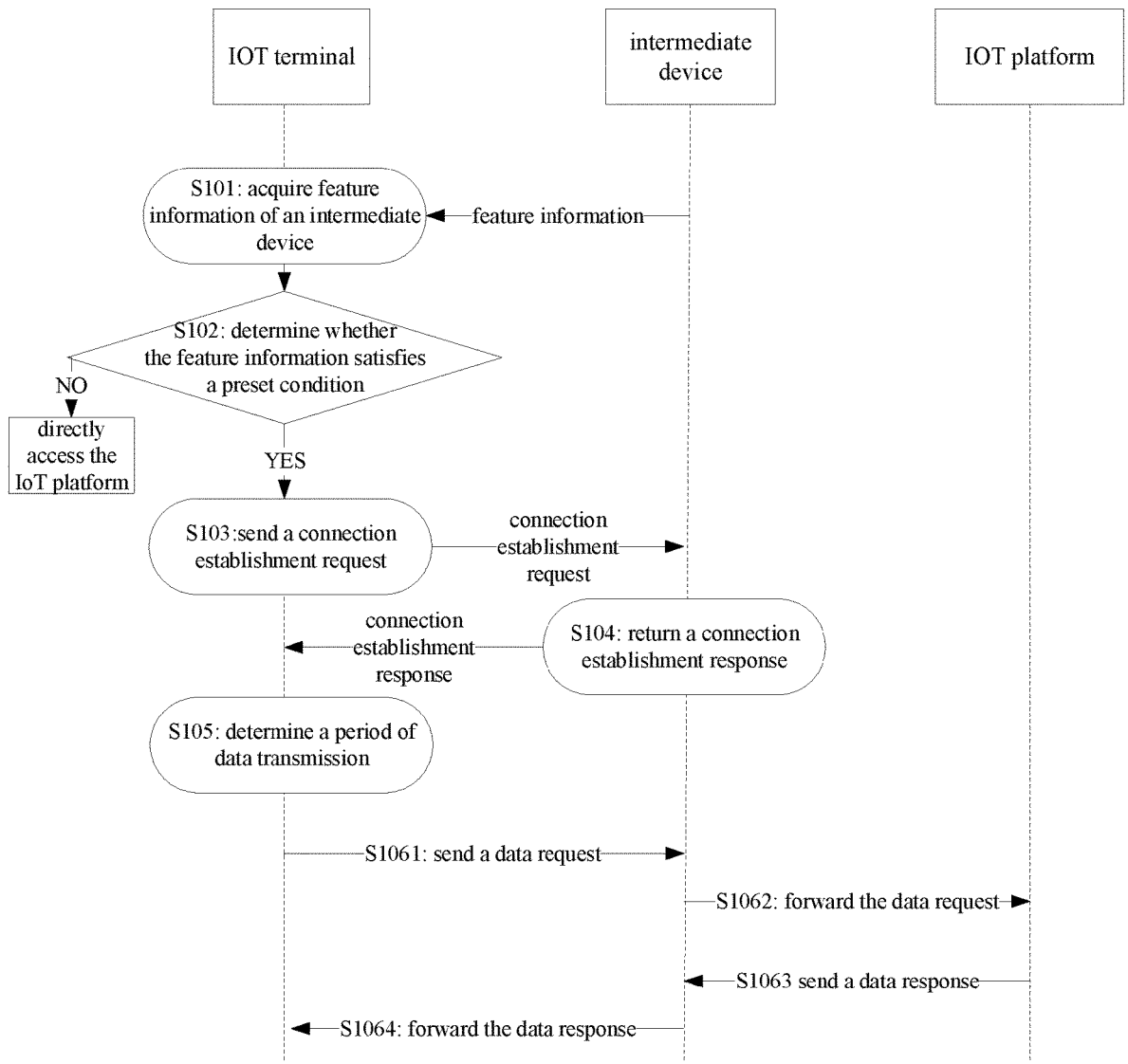
FIG. 2 is a flowchart of a method of an IoT terminal accessing an IoT platform according to Embodiment 1 of the present disclosure.

Embodiment 1 of the present disclosure provides an exemplary flow of a method of an IoT terminal accessing an IoT platform. As shown in FIG. 2, the method may comprise the following steps.

Step S101: the IoT terminal acquires feature information of an intermediate device.

The feature information can comprise at least one of power amount information, traffic information, signal strength information, location information, storage space information, processing capability information, signal transmission rate information, or signal transmission stability information.

Step S102: the IoT terminal determines whether the acquired feature information satisfies a preset condition; if so, the IoT terminal decides to access the IoT platform through the intermediate device, and the following step S103 is performed; if not, the IoT terminal directly accesses the IoT platform without utilizing the intermediate device.

In step S102, the IoT terminal determines whether the acquired feature information of the intermediate device satisfies the preset condition related to the intermediate device. For example, it is determined whether the power amount of the intermediate device is greater than a preset power amount threshold, whether the traffic is greater than the preset traffic threshold, whether the signal strength is greater than a preset signal strength threshold, whether a distance between the location of the intermediate device and the location of the IoT terminal is less than a preset distance value, whether the storage space is greater than a preset storage space threshold, whether the processing capability is greater than a preset processing capability threshold, whether the signal transmission rate is greater than a preset signal transmission rate threshold, or whether the signal transmission stability is greater than a preset signal transmission stability threshold. Those skilled in the art can specify the preset condition according to actual situations and requirements, and no further examples will be given herein.

Step S103: the IoT terminal sends a connection establishment request to the intermediate device.

Step S104: the intermediate device returns a connection establishment response.

Step S105: the IoT terminal determines a period of data transmission.

For example, in the step S105, the IoT terminal can determine the period of data transmission according to the acquired feature information. For example, if the power amount of the intermediate device is low, the IoT terminal can determine that data is sent to the IoT platform through the intermediate device over a longer period or at a lower frequency, so as to save power.

Step S106: the IoT terminal accesses the IoT platform through the intermediate device.

The step S106 may comprise the following sub-steps:

Sub-step S1061: the IoT terminal sends a data request to the intermediate device;

Sub-step S1062: the intermediate device forwards the data request to the IoT platform;

Sub-step S1063: the IoT platform sends a data response to the intermediate device;

Sub-step S1064: the intermediate device forwards the data response to the IoT terminal.

Figure 3:
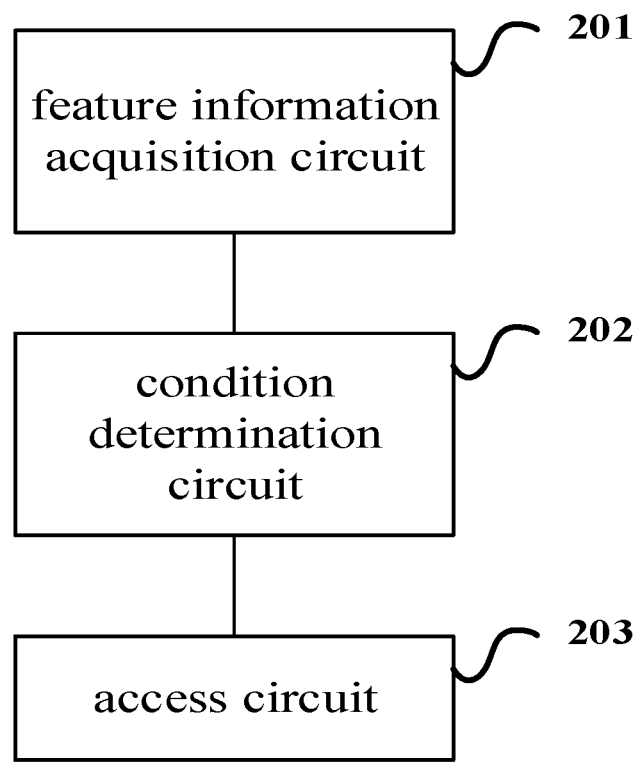
FIG. 3 is a block diagram of the internal structure of an IoT terminal according to Embodiment 1 of the present disclosure.

Based on the method of an IoT terminal accessing an IoT platform provided in Embodiment 1 of the present disclosure, an IoT terminal is provided in Embodiment 1 of the present disclosure, the internal structure of which is shown in FIG. 3 and may comprise a feature information acquisition circuit 201, a condition determination circuit 202 and an access circuit 203.

The feature information acquisition circuit 201 is configured to acquire feature information of an intermediate device.

The condition determination circuit 202 is configured to determine whether the feature information of the intermediate device satisfies a preset condition related to the intermediate device.

The access circuit 203 is configured to decide, according to the determination by the condition determination circuit 202, whether to access an IoT platform through the intermediate device; send a connection establishment request to the intermediate device after deciding to access the IoT platform through the intermediate device; determine a period of data transmission according to the acquired feature information after receiving a connection establishment response returned from the intermediate device; and then access the IoT platform through the intermediate device.

In the technical solution of Embodiment 1 of the present disclosure, before accessing the IoT platform through the intermediate device, the IoT terminal firstly acquires the feature information of the intermediate device, such as the power amount information or the traffic information of the intermediate device, and then determines whether the acquired feature information satisfies a preset condition, so as to decide, according to the determination, whether the IoT terminal accesses the IoT platform through the intermediate device. In this way, according to the determination, the IoT platform can be accessed selectively through the intermediate device to avoid a communication problem caused by accessing the IoT platform through an intermediate device having insufficient power amount, insufficient traffic, weak signal strength, a long distance, insufficient storage space, insufficient processing capability, slow signal transmission, or unstable signal transmission, thereby improving the reliability of the IoT terminal accessing the IoT platform.

Embodiment 2

Figure 4:
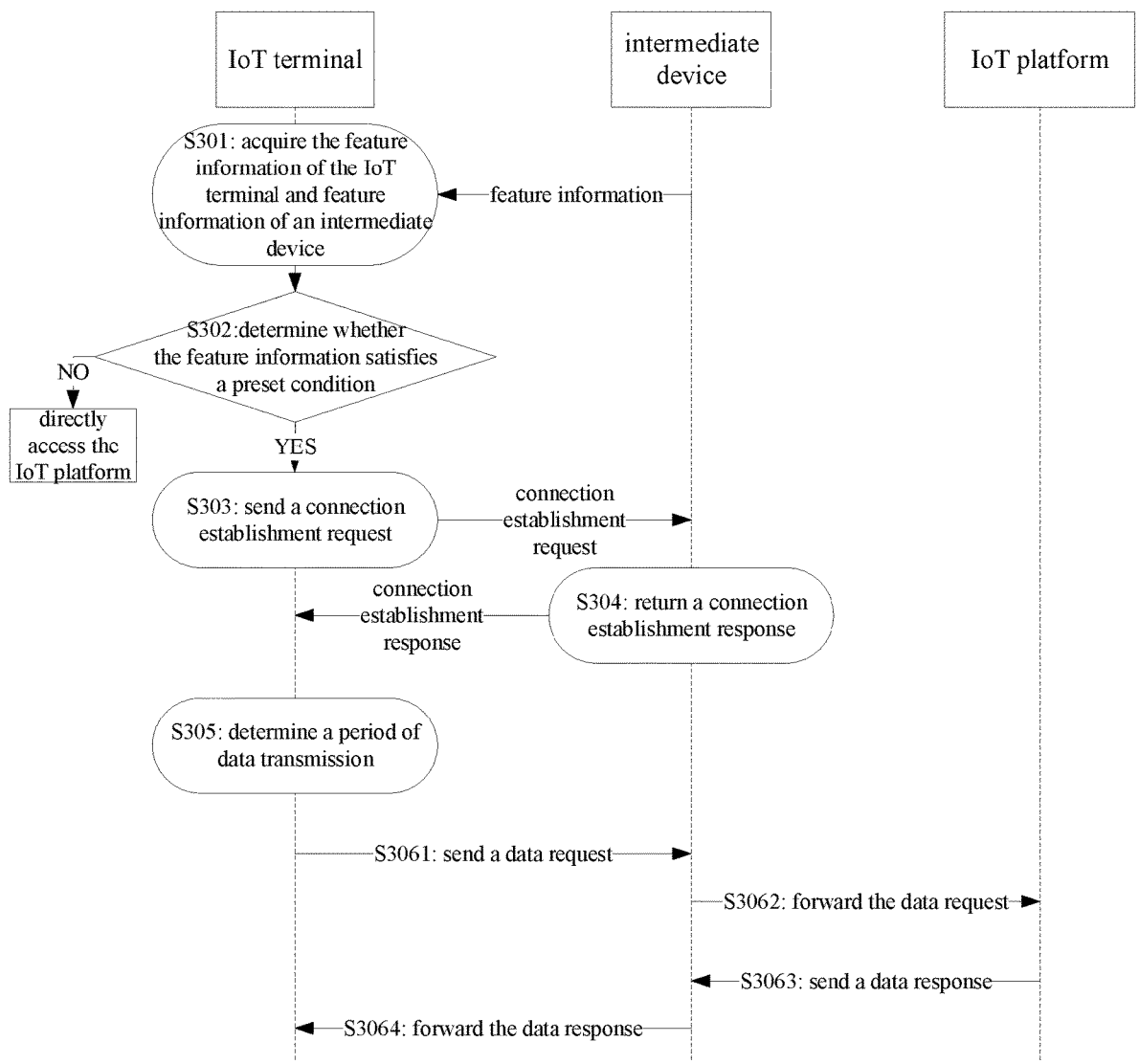
FIG. 4 is a flowchart of a method of an IoT terminal accessing an IoT platform according to Embodiment 2 of the present disclosure.

Embodiment 2 of the present disclosure provides an exemplary flow of a method of an IoT terminal accessing an IoT platform. As shown in FIG. 4, the method may comprise the following steps.

Step S301: the IoT terminal acquires the feature information of the IoT terminal and the feature information of an intermediate device.

The feature information can comprise at least one of power amount information, traffic information, signal strength information, location information, storage space information, processing capability information, signal transmission rate information, or signal transmission stability information.

Step S302: the IoT terminal determines whether the acquired feature information satisfies a preset condition; if so, the IoT terminal decides to access the IoT platform through the intermediate device, and the following step S303 is performed; if not, the IoT terminal directly accesses the IoT platform without utilizing the intermediate device.

In the step S302, the IoT terminal determines whether the acquired feature information of the intermediate device satisfies the preset condition related to the intermediate device, and whether the feature information of the IoT terminal satisfies the preset condition related to the IoT terminal. For example, determining whether the feature information of the intermediate device satisfies the preset condition related to the intermediate device may comprise: whether the power amount of the intermediate device is greater than a preset power amount threshold, whether the remaining traffic is greater than the preset traffic threshold, whether the signal strength is greater than a preset signal strength threshold, whether a distance between the location of the intermediate device and the location of the IoT terminal is less than a preset distance value. For example, determining whether the feature information of the IoT terminal satisfies the preset condition related to the IoT terminal may comprise: whether the power amount of the IoT terminal is greater than a preset power amount threshold, whether the signal strength is greater than a preset signal strength threshold. Those skilled in the art can specify the preset conditions related to the intermediate device and the IoT terminal according to actual situations and requirements, and no further examples will be given herein.

In the case where the IoT terminal determines that the feature information of the intermediate device satisfies the preset condition related to the intermediate device, and the feature information of the IoT terminal satisfies the preset condition related to the IoT terminal, the IoT terminal decides to access the IoT platform through the intermediate device, and the following step S303 is performed; otherwise, the IoT terminal directly accesses the IoT platform without utilizing the intermediate device.

In the step S302, in addition to determining whether the feature information of the intermediate device satisfies the preset condition related to the intermediate device, the IoT terminal also determines whether the feature information of the IoT terminal satisfies the preset condition related to the IoT terminal. In this way, in addition to avoiding a communication problem caused by accessing an intermediate device having insufficient power amount, insufficient traffic, weak signal strength, a long distance, insufficient storage space, insufficient processing capability, slow signal transmission, or unstable signal transmission, it is also possible to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Step S303: the IoT terminal sends a connection establishment request to the intermediate device.

Step S304: the intermediate device returns a connection establishment response.

Step S305: the IoT terminal determines a period of data transmission.

For example, in the step S305, the IoT terminal can determine the period of data transmission according to the acquired feature information. For example, if the power amount of the intermediate device or the IoT terminal is low, the IoT terminal can determine that data is sent to the IoT platform through the intermediate device over a longer period or at a lower frequency, so as to save power.

Step S306: the IoT terminal accesses the IoT platform through the intermediate device.

The step S306 may comprise the following sub-steps:

Sub-step S3061: the IoT terminal sends a data request to the intermediate device;

Sub-step S3062: the intermediate device forwards the data request to the IoT platform;

Sub-step S3063: the IoT platform sends a data response to the intermediate device;

Sub-step S3064: the intermediate device forwards the data response to the IoT terminal.

Figure 5:
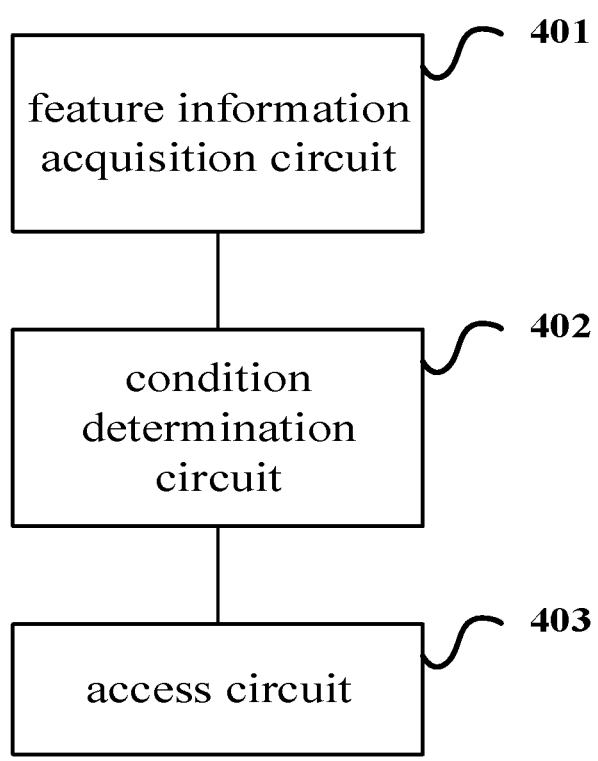
FIG. 5 is a block diagram of the internal structure of an IoT terminal according to Embodiment 2 of the present disclosure.

Based on the method of an IoT terminal accessing an IoT platform provided in Embodiment 2 of the present disclosure, an IoT terminal is provided in Embodiment 2 of the present disclosure, the internal structure of which is shown in FIG. 5 and may comprise a feature information acquisition circuit 401, a condition determination circuit 402 and an access circuit 403.

The feature information acquisition circuit 401 is configured to acquire feature information of the IoT terminal and feature information of an intermediate device.

The condition determination circuit 402 is configured to determine whether the feature information of the intermediate device satisfies a preset condition related to the intermediate device, and whether the feature information of the IoT terminal satisfies a preset condition related to the IoT terminal.

The access circuit 403 is configured to decide, according to the determination by the condition determination circuit 402, whether to access an IoT platform through the intermediate device; send a connection establishment request to the intermediate device after deciding to access the IoT platform through the intermediate device; determine a period of data transmission according to the acquired feature information after receiving a connection establishment response returned from the intermediate device; and then access the IoT platform through the intermediate device.

In the technical solution of Embodiment 2 of the present disclosure, before accessing the IoT platform through the intermediate device, the IoT terminal firstly acquires the feature information of the intermediate device and the feature information of the IoT terminal, and then determines whether the feature information of the intermediate device satisfies the preset condition related to the intermediate device and whether the feature information of the IoT terminal satisfies the preset condition related to the IoT terminal, so as to decide, according to the determination, whether the IoT terminal accesses the IoT platform through the intermediate device. In this way, according to the determination, the IoT platform can be accessed selectively through the intermediate device to avoid a communication problem caused by accessing an intermediate device having insufficient power amount, insufficient traffic, weak signal strength, a long distance, insufficient storage space, insufficient processing capability, slow signal transmission, or unstable signal transmission. Moreover, it is also possible to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Embodiment 3

Figure 6:
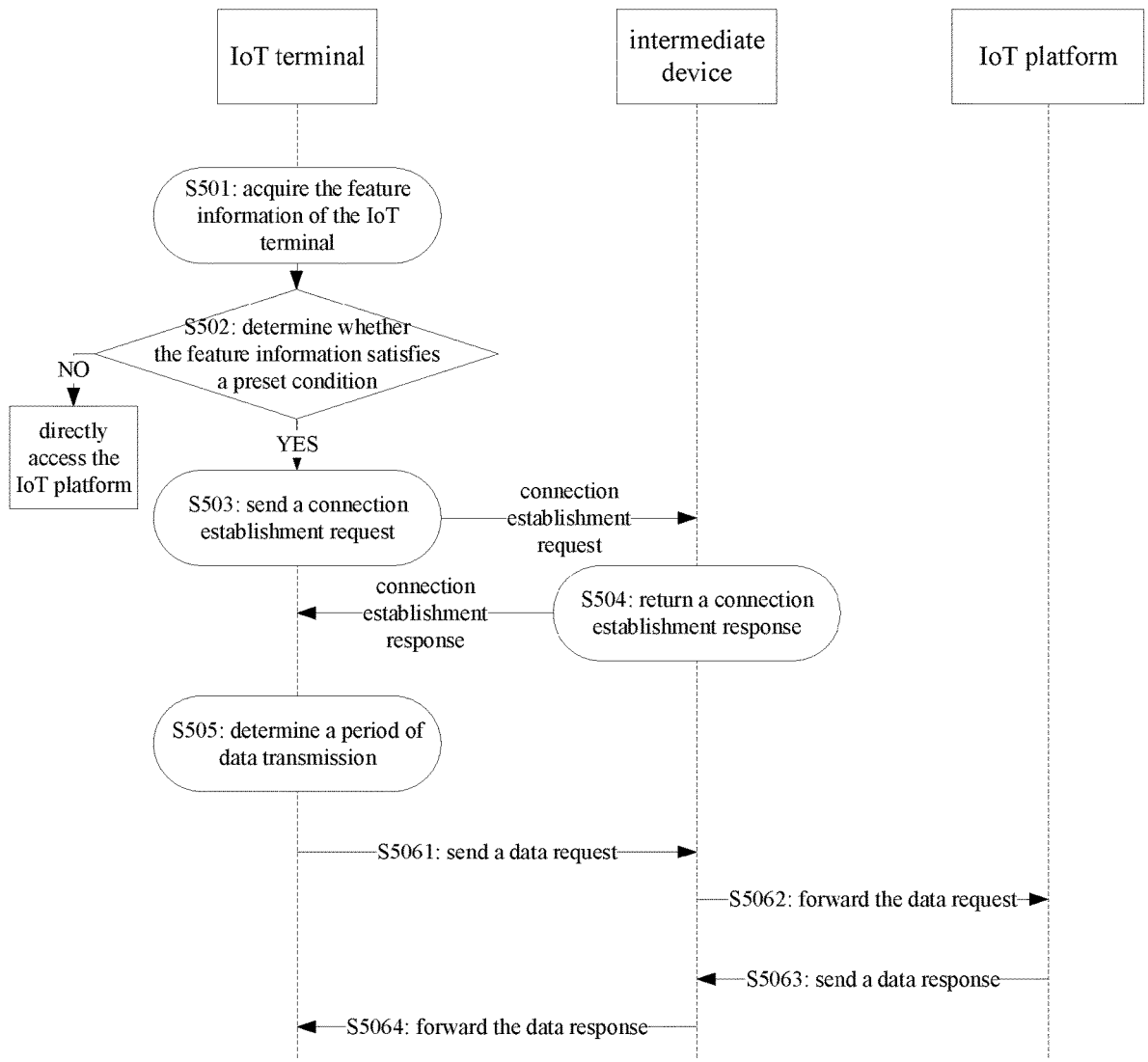
FIG. 6 is a flowchart of a method of an IoT terminal accessing an IoT platform according to Embodiment 3 of the present disclosure.

Embodiment 3 of the present disclosure provides an exemplary flow of a method of an IoT terminal accessing an IoT platform. As shown in FIG. 6, the method may comprise the following steps.

Step S501: the IoT terminal acquires feature information of the IoT terminal.

The feature information may comprise at least one of power amount information, traffic information, or signal strength information.

Step S502: the IoT terminal determines whether the acquired feature information satisfies a preset condition; if so, the IoT terminal decides to access the IoT platform through the intermediate device, and the following step S503 is performed; if not, the IoT terminal directly accesses the IoT platform without utilizing the intermediate device.

In the step S502, the IoT terminal determines whether the feature information of the IoT terminal satisfies a preset condition related to the IoT terminal. For example, determining whether the feature information of the IoT terminal satisfies the preset condition related to the IoT terminal may comprise: whether the power amount of the IoT terminal is greater than a preset power amount threshold, whether the signal strength is greater than a preset signal strength threshold. Those skilled in the art can specify the preset condition related to the IoT terminal according to actual situations and requirements, and no further examples will be given herein.

In the case where the IoT terminal determines that the feature information of the IoT terminal satisfies the preset condition related to the IoT terminal, the IoT terminal decides to access the IoT platform through the intermediate device, and the following step S503 is performed; if not, the IoT terminal directly accesses the IoT platform without utilizing the intermediate device. In this way, it is possible to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Step S503: the IoT terminal sends a connection establishment request to the intermediate device.

Step S504: the intermediate device returns a connection establishment response.

Step S505: the IoT terminal determines a period of data transmission.

For example, in the step S505, the IoT terminal can determine the period of data transmission according to the acquired feature information. For example, if the power amount of the IoT terminal is low, the IoT terminal can determine that data is sent to the IoT platform through the intermediate device over a longer period or at a lower frequency, so as to save power.

Step S506: the IoT terminal accesses the IoT platform through the intermediate device.

This step S506 may comprise the following sub-steps:

Sub-step S5061: the IoT terminal sends a data request to the intermediate device;

Sub-step S5062: the intermediate device forwards the data request to the IoT platform;

Sub-step S5063: the IoT platform sends a data response to the intermediate device;

Sub-step S5064: the intermediate device forwards the data response to the IoT terminal.

Figure 7:
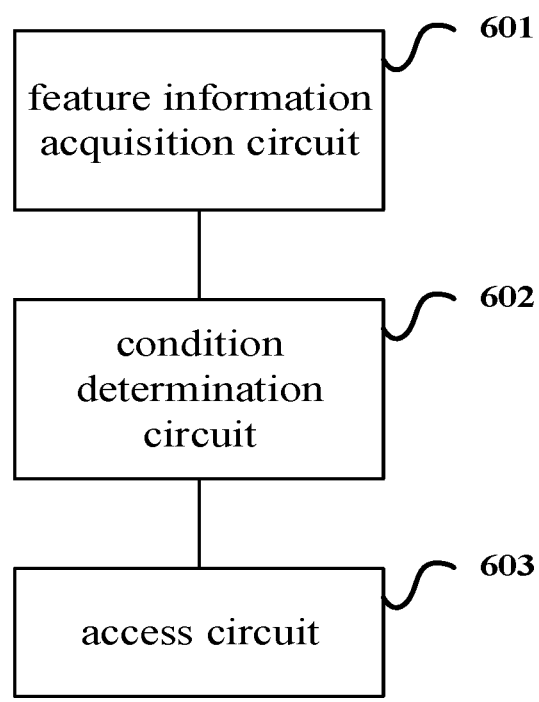
FIG. 7 is a block diagram of the internal structure of an IoT terminal according to Embodiment 3 of the present disclosure.

Based on the method of an IoT terminal accessing an IoT platform provided in Embodiment 3 of the present disclosure, an IoT terminal is provided in Embodiment 3 of the present disclosure, the internal structure of which is shown in FIG. 7 and may comprise a feature information acquisition circuit 601, a condition determination circuit 602, and an access circuit 603.

The feature information acquisition circuit 601 is configured to acquire feature information of the IoT terminal.

The condition determination circuit 602 is configured to determine whether the feature information of the IoT terminal satisfies a preset condition related to the IoT terminal.

The access circuit 603 is configured to decide, according to the determination by the condition determination circuit 602, whether to access an IoT platform through the intermediate device; send a connection establishment request to the intermediate device after deciding to access the IoT platform through the intermediate device; determine a period of data transmission according to the acquired feature information after receiving a connection establishment response returned from the intermediate device; and then access the IoT platform through the intermediate device.

In the technical solution of Embodiment 3 of the present disclosure, before accessing the IoT platform through the intermediate device, the IoT terminal firstly acquires the feature information of the IoT terminal, and then determines whether the feature information of the IoT terminal satisfies the preset condition related to the IoT terminal, so as to decide, according to the determination, whether the IoT terminal accesses the IoT platform through the intermediate device. In this way, according to the determination, the IoT platform can be accessed selectively through the intermediate device to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Embodiment 4

Figure 8:
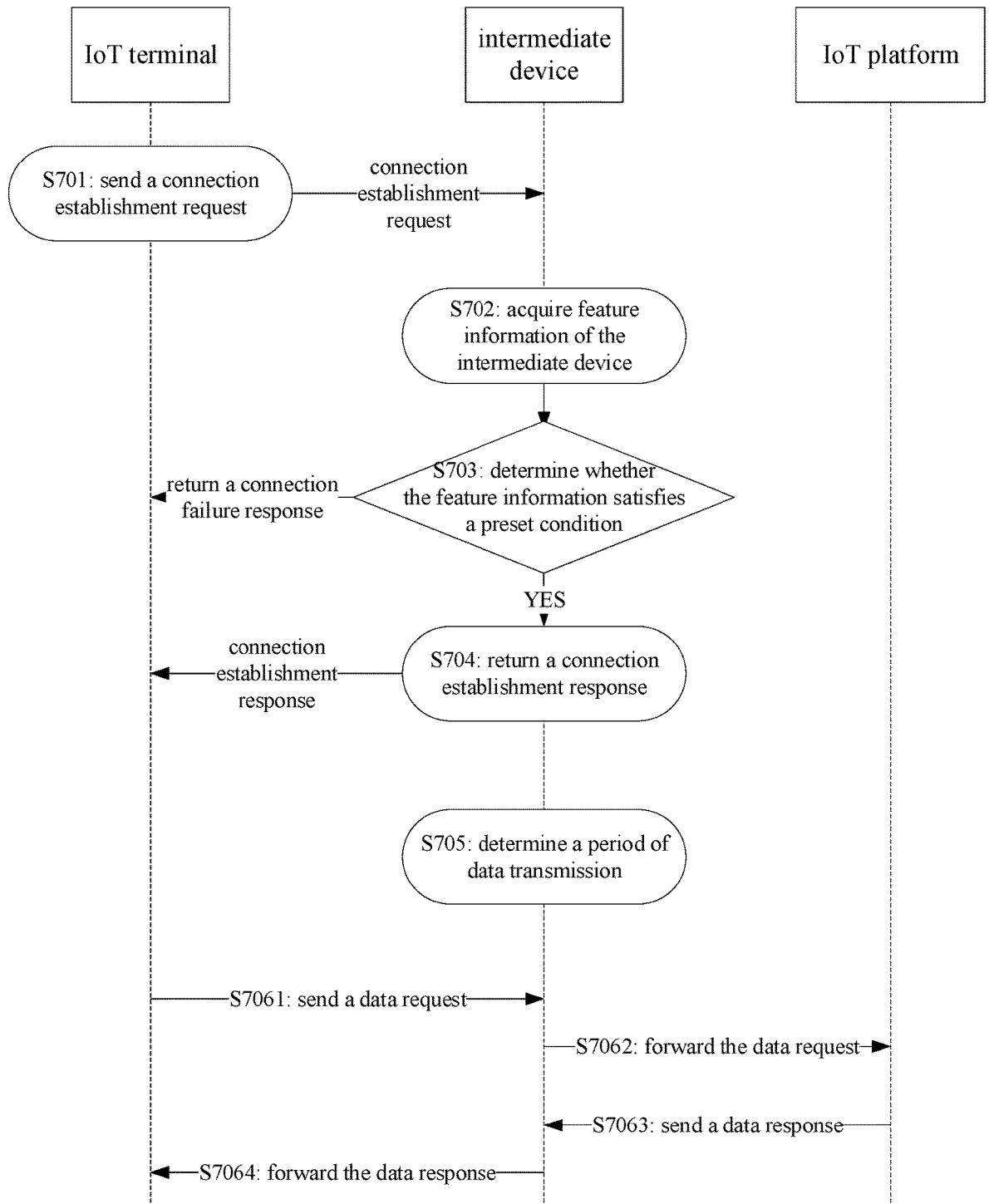
FIG. 8 is a flowchart of a method of an IoT terminal accessing an IoT platform according to Embodiment 4 of the present disclosure.

Embodiment 4 of the present disclosure provides an exemplary flow of a method of an IoT terminal accessing an IoT platform. As shown in FIG. 8, the method may comprise the following steps.

Step S701: the IoT terminal sends a connection establishment request to an intermediate device.

Step S702: the intermediate device acquires feature information of the intermediate device.

The feature information may comprise at least one of power amount information, traffic information, signal strength information, location information, storage space information, processing capability information, signal transmission rate information, or signal transmission stability information.

Step S703: the intermediate device determines whether the acquired feature information satisfies a preset condition; if so, it is determined that the IoT terminal can access the IoT platform through the intermediate device, and the following step S704 is performed; if not, the intermediate device sends a connection failure response to the IoT terminal.

In the step S703, the intermediate device determines whether the feature information of the intermediate device satisfies the preset condition related to the intermediate device. For example, it is determined whether the power amount of the intermediate device is greater than a preset power amount threshold, whether the remaining traffic is greater than the preset traffic threshold, whether the signal strength is greater than a preset signal strength threshold. Those skilled in the art can specify the preset condition according to actual situations and requirements, and no further examples will be given herein.

Step S704: the intermediate device returns a connection establishment response.

Step S705: the intermediate device determines a period of data transmission.

For example, in the step S705, the intermediate device can determine the period of data transmission according to the acquired feature information. For example, if the power amount of the intermediate device is low, the intermediate device may determine that data is sent to the IoT platform by the IoT terminal over a longer period or at a lower frequency, so as to save power.

Step S706: the IoT terminal accesses the IoT platform through the intermediate device.

The step S706 may comprise the following sub-steps:

Sub-step S7061: the IoT terminal sends a data request to the intermediate device;

Sub-step S7062: the intermediate device forwards the data request to the IoT platform;

Sub-step S7063: the IoT platform sends a data response to the intermediate device;

Sub-step S7064: the intermediate device forwards the data response to the IoT terminal.

In the above step S703, after the intermediate device determines that the acquired feature information does not satisfy the preset condition and sends the connection failure response to the IoT terminal, the IoT terminal can directly access the IoT platform and can cache data, or can also continue to determine whether another intermediate device satisfies the preset condition and can access the IoT platform through the other intermediate device that satisfies the preset condition.

Figure 9:
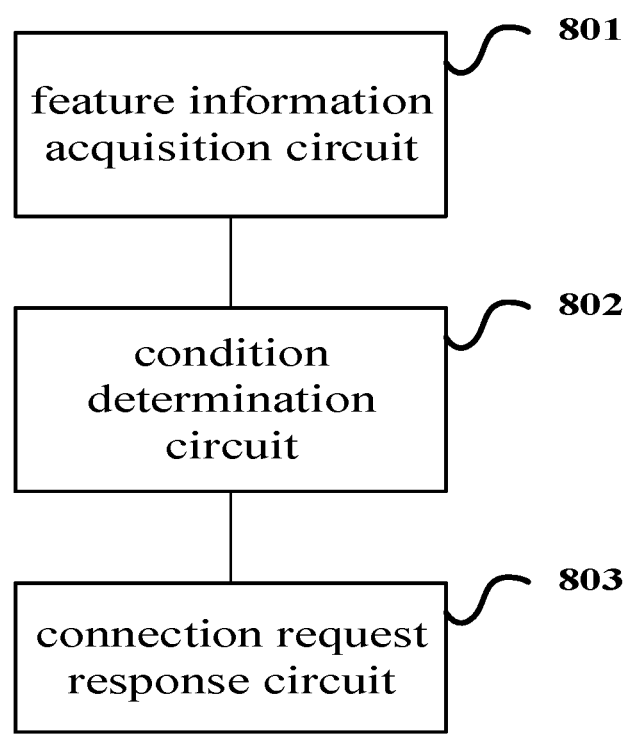
FIG. 9 is a block diagram of the internal structure of an intermediate device according to Embodiment 4 of the present disclosure.

Based on the method of an IoT terminal accessing an IoT platform provided in Embodiment 4 of the present disclosure, an intermediate device is provided in Embodiment 4 of the present disclosure, the internal structure of which is shown in FIG. 9 and may comprise a feature information acquisition circuit 801, a condition determination circuit 802, and a connection request response circuit 803.

The feature information acquisition circuit 801 is configured to acquire feature information of the intermediate device after receiving a connection establishment request sent by an IoT terminal.

The condition determination circuit 802 is configured to determine whether the feature information of the intermediate device satisfies a preset condition related to the intermediate device.

The connection request response circuit 803 is configured to decide, according to the determination by the condition determination circuit 802, whether to respond to the connection establishment request; after deciding to return a connection establishment response, the connection request response circuit 803 may further determine a period of data transmission according to the acquired feature information, and then enable the IoT terminal to access the IoT platform through the intermediate device.

In the technical solution of Embodiment 4 of the present disclosure, after receiving a connection establishment request from the IoT terminal, the intermediate device firstly acquires the feature information of the intermediate device, such as the power amount information or the traffic information of the intermediate device, and then determines whether the acquired feature information satisfies a preset condition, so as to decide, according to the determination, whether the IoT terminal accesses the IoT platform through the intermediate device. In this way, according to the determination, the IoT platform can be accessed selectively through the intermediate device to avoid a communication problem caused by accessing the IoT platform through an intermediate device having insufficient power amount, insufficient traffic, or weak signal strength, thereby improving the reliability of the IoT terminal accessing the IoT platform.

Embodiment 5

Figure 10:
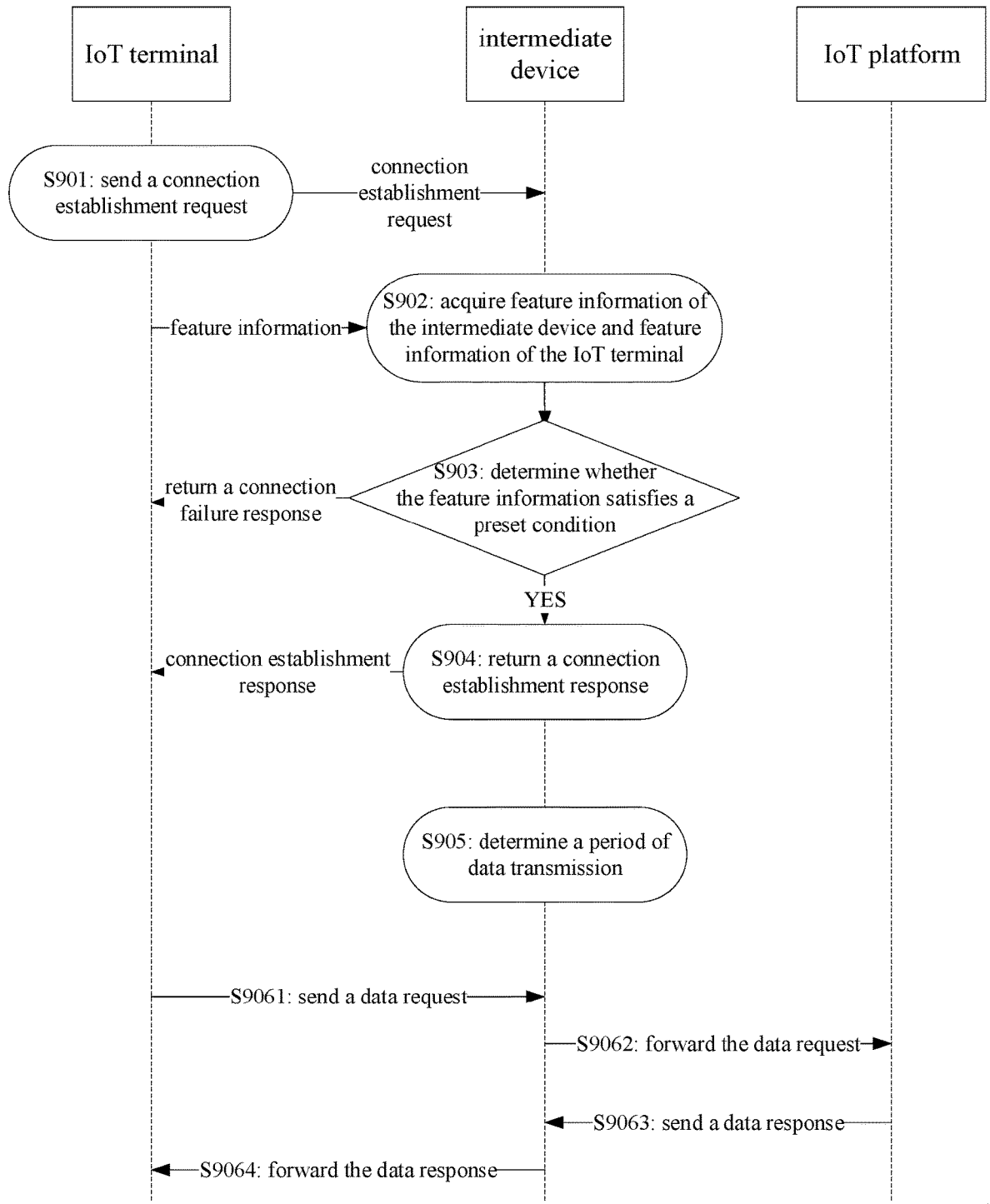
FIG. 10 is a flowchart of a method of an IoT terminal accessing an IoT platform according to Embodiment 5 of the present disclosure.

Embodiment 5 of the present disclosure provides an exemplary flow of a method of an IoT terminal accessing an IoT platform. As shown in FIG. 10, the method may comprise the following steps.

Step S901: the IoT terminal sends a connection establishment request to an intermediate device.

Step S902: the intermediate device acquires feature information of the intermediate device and feature information of the IoT terminal.

The feature information may comprise at least one of power amount information, traffic information, signal strength information, location information, storage space information, processing capability information, signal transmission rate information, or signal transmission stability information.

Step S903: the intermediate device determines whether the acquired feature information satisfies a preset condition; if so, it is determined that the IoT terminal accesses the IoT platform through the intermediate device, and the following step S904 is performed; if not, the intermediate device sends a connection failure response to the IoT terminal.

In the step S903, the intermediate device determines whether the feature information of the intermediate device satisfies a preset condition related to the intermediate device, and whether the feature information of the IoT terminal satisfies a preset condition related to the IoT terminal. For example, it is determined whether the power amount of the intermediate device is greater than a preset power amount threshold, whether the remaining traffic is greater than the preset traffic threshold, whether the signal strength is greater than a preset signal strength threshold, whether a distance between the location of the intermediate device and the location of the IoT terminal is less than a preset distance value. For example, determining whether the feature information of the IoT terminal satisfies the preset condition related to the IoT terminal may comprise: determining whether the power amount of the IoT terminal is greater than a preset power amount threshold, whether the signal strength is greater than a preset signal strength threshold. Those skilled in the art can specify the preset conditions related to the intermediate device and the IoT terminal according to actual situations and requirements, and no further examples will be given herein.

In the case where the intermediate device determines that the feature information of the intermediate device satisfies the preset condition related to the intermediate device, and the feature information of the IoT terminal satisfies the preset condition related to the IoT terminal, the intermediate device decides that the IoT platform is accessed by the IoT terminal through the intermediate device, and the following step S904 is performed; otherwise, the intermediate device sends a connection failure response to the IoT terminal.

In the step S903, in addition to determining whether the feature information of the intermediate device satisfies the preset condition related to the intermediate device, the intermediate device further determines whether the feature information of the IoT terminal satisfies the preset condition related to the IoT terminal. In this way, in addition to avoiding a communication problem caused by accessing an intermediate device having insufficient power amount, insufficient traffic, weak signal strength, a long distance, insufficient storage space, insufficient processing capability, slow signal transmission, or unstable signal transmission, it is also possible to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Step S904: the intermediate device returns a connection establishment response.

Step S905: the intermediate device determines a period of data transmission.

For example, in the step S905, the intermediate device can determine the period of data transmission according to the acquired feature information. For example, if the power amount of the intermediate device or the IoT terminal is low, the intermediate device may determine that data is sent to the IoT platform by the IoT terminal over a longer period or at a lower frequency, so as to save power.

Step S906: the IoT terminal accesses the IoT platform through the intermediate device.

The step S906 may comprise the following sub-steps:

Sub-step S9061: the IoT terminal sends a data request to the intermediate device;

Sub-step S9062: the intermediate device forwards the data request to the IoT platform;

Sub-step S9063: the IoT platform sends a data response to the intermediate device;

Sub-step S9064: the intermediate device forwards the data response to the IoT terminal.

In the above step S903, after the intermediate device determines that the acquired feature information does not satisfy the preset condition and sends the connection failure response to the IoT terminal, the IoT terminal can directly access the IoT platform and can cache data, or can also continue to determine whether another intermediate device satisfies the preset condition and can access the IoT platform through the other intermediate device that satisfies the preset condition.

Figure 11:
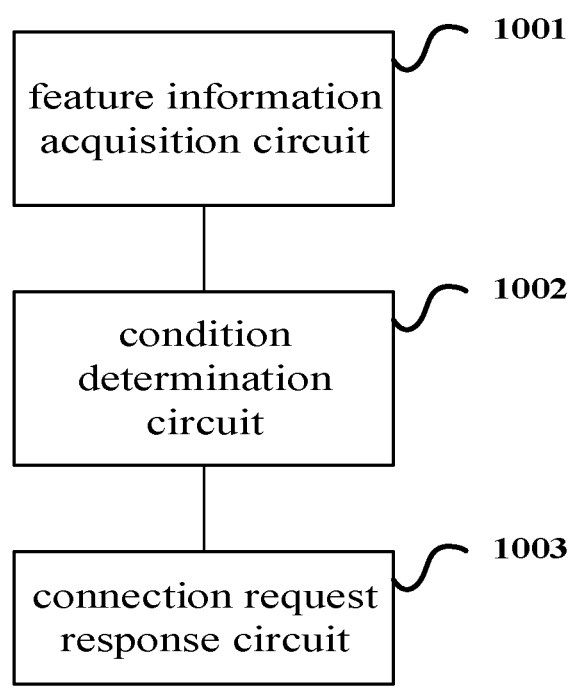
FIG. 11 is a block diagram of the internal structure of an intermediate device according to Embodiment 5 of the present disclosure.

Based on the method of an IoT terminal accessing an IoT platform provided in Embodiment 5 of the present disclosure, an intermediate device is provided in Embodiment 5 of the present disclosure, the internal structure of which is shown in FIG. 11 and may comprise a feature information acquisition circuit 1001, a condition determination circuit 1002, and a connection request response circuit 1003.

The feature information acquisition circuit 1001 is configured to acquire feature information of the intermediate device and feature information of the IoT terminal after receiving a connection establishment request sent by the IoT terminal.

The condition determination circuit 1002 is configured to determine whether the feature information of the intermediate device satisfies a preset condition related to the intermediate device; and whether the feature information of the IoT terminal satisfies a preset condition related to the IoT terminal.

The connection request response circuit 1003 is configured to decide, according to the determination by the condition determination circuit 1002, whether to respond to the connection establishment request; after deciding to return a connection establishment response, the connection request response circuit 1003 may further determine a period of data transmission according to the acquired feature information, and then enable the IoT terminal to access the IoT platform through the intermediate device.

In the technical solution of Embodiment 5 of the present disclosure, after receiving the connection establishment request from the IoT terminal, the intermediate device firstly acquires the feature information of the intermediate device and the feature information of the IoT terminal, and then determines whether the feature information of the intermediate device satisfies the preset condition related to the intermediate device and whether the feature information of the IoT terminal satisfies the preset condition related to the IoT terminal, so as to decide, according to the determination, whether the IoT terminal accesses the IoT platform through the intermediate device. In this way, according to the determination, the IoT platform can be accessed selectively through the intermediate device to avoid a communication problem caused by accessing an intermediate device having insufficient power amount, insufficient traffic, weak signal strength, a long distance, insufficient storage space, insufficient processing capability, slow signal transmission, or unstable signal transmission. Moreover, it is also possible to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Embodiment 6

Figure 12:
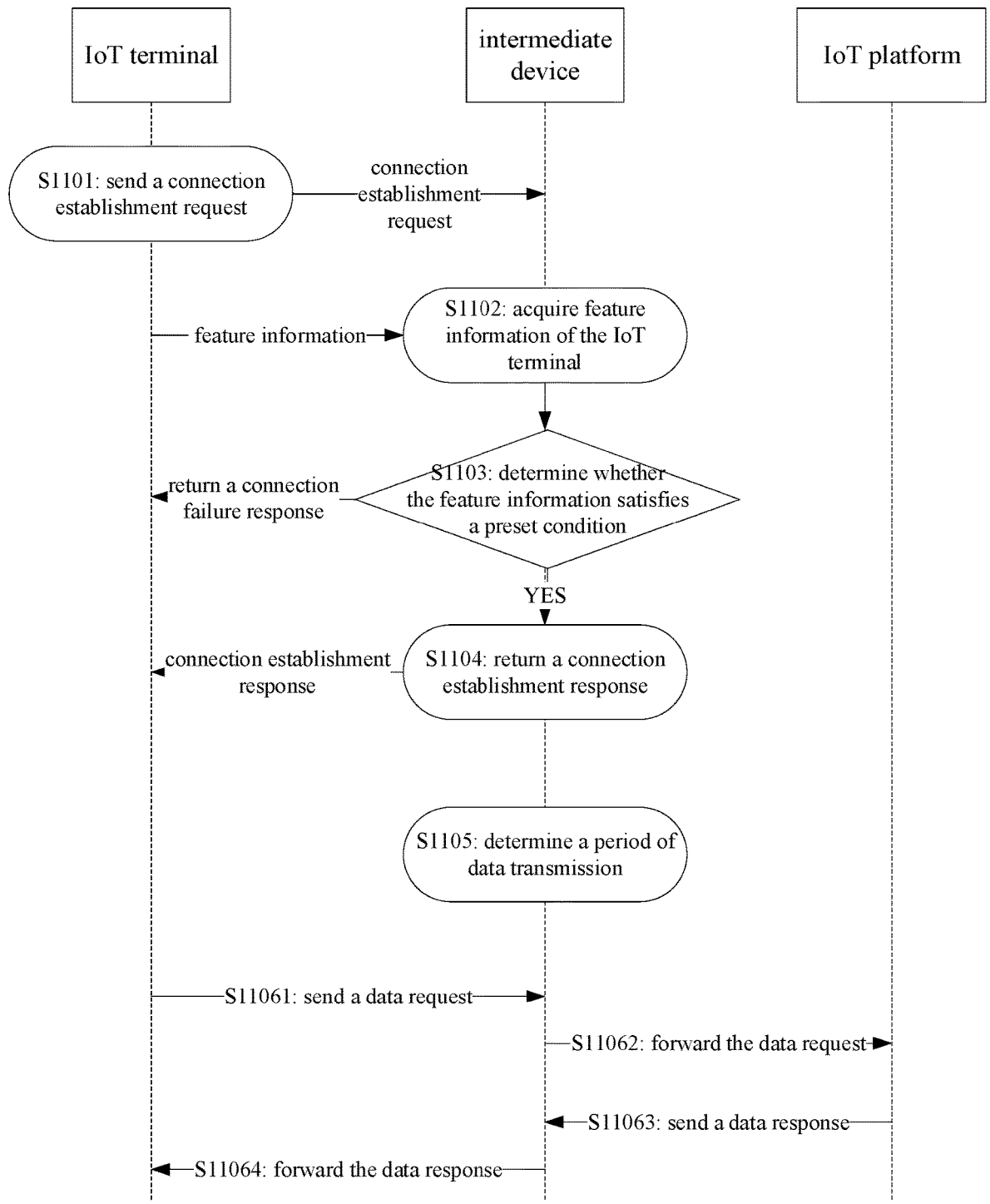
FIG. 12 is a flowchart of a method of an IoT terminal accessing an IoT platform according to Embodiment 6 of the present disclosure.

Embodiment 6 of the present disclosure provides an exemplary flow of a method of an IoT terminal accessing an IoT platform. As shown in FIG. 12, the method may comprise the following steps.

Step S1101: the IoT terminal sends a connection establishment request to an intermediate device.

Step S1102: the intermediate device acquires the feature information of the IoT terminal.

The feature information may comprise at least one of power amount information, traffic information, signal strength information, location information, storage space information, processing capability information, signal transmission rate information, or signal transmission stability information.

Step S1103: the intermediate device determines whether the acquired feature information satisfies a preset condition; if so, it is decided that the IoT terminal can access the IoT platform through the intermediate device, and the following step S1104 is performed; otherwise, the intermediate device sends a connection failure response to the IoT terminal.

In the step S1103, the intermediate device determines whether the feature information of the IoT terminal satisfies a preset condition related to the IoT terminal. For example, determining whether the feature information of the IoT terminal satisfies the preset condition related to the IoT terminal may comprise: determining whether the power amount of the IoT terminal is greater than a preset power amount threshold, whether the signal strength is greater than a preset signal strength threshold, whether a distance between the location of the intermediate device and the location of the IoT terminal is less than a preset distance value. Those skilled in the art can specify the preset condition related to the IoT terminal according to actual situations and requirements, and no further examples will be given herein.

In the case where the intermediate device determines that the feature information of the IoT terminal satisfies a preset condition related to the IoT terminal, the intermediate device decides that the IoT terminal can access the IoT platform through the intermediate device, and the following step S1104 is performed; otherwise, the intermediate device sends a connection failure response to the IoT terminal.

In the step S1103, it is determined whether the feature information of the IoT terminal satisfies the preset condition related to the IoT terminal, so that it is possible to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Step S1104: the intermediate device returns a connection establishment response.

Step S1105: the intermediate device determines a period of data transmission.

For example, in the step S1105, the intermediate device can determine the period of data transmission according to the acquired feature information. For example, if the power amount of the intermediate device or the IoT terminal is low, the intermediate device may determine that data is sent to the IoT platform by the IoT terminal over a longer period or at a lower frequency, so as to save power.

Step S1106: the IoT terminal accesses the IoT platform through the intermediate device.

The step S1106 may comprise the following sub-steps:

Sub-step S11061: the IoT terminal sends a data request to the intermediate device;

Sub-step S11062: the intermediate device forwards the data request to the IoT platform;

Sub-step S11063: the IoT platform sends a data response to the intermediate device;

Sub-step S11064: the intermediate device forwards the data response to the IoT terminal.

In the above step S1103, after the intermediate device determines that the acquired feature information does not satisfy the preset condition and sends the connection failure response to the IoT terminal, the IoT terminal can directly access the IoT platform and can cache data, or can also continue to determine whether another intermediate device satisfies the preset condition and can access the IoT platform through the other intermediate device that satisfies the preset condition.

Figure 13:
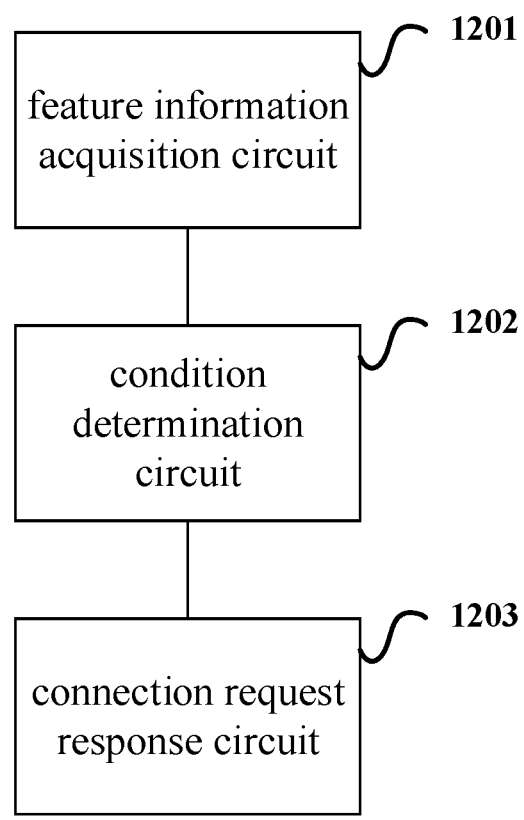
FIG. 13 is a block diagram of the internal structure of an intermediate device according to Embodiment 6 of the present disclosure.

Based on the method of an IoT terminal accessing an IoT platform provided in Embodiment 6 of the present disclosure, an intermediate device is provided in Embodiment 6 of the present disclosure, the internal structure of which is shown in FIG. 13 and may comprise a feature information acquisition circuit 1201, a condition determination circuit 1202, and a connection request response circuit 1203.

The feature information acquisition circuit 1201 is configured to acquire feature information of the IoT terminal after receiving a connection establishment request sent by the IoT terminal.

The condition determination circuit 1202 is configured to determine whether the feature information of the IoT terminal satisfies a preset condition related to the IoT terminal.

The connection request response circuit 1203 is configured to decide, according to the determination by the condition determination circuit 1202, whether to respond to the connection establishment request; after deciding to return a connection establishment response, the connection request response circuit 1203 may further determine a period of data transmission according to the acquired feature information, and then enable the IoT terminal to access the IoT platform through the intermediate device.

In the technical solution of Embodiment 6 of the present disclosure, after receiving the connection establishment request from the IoT terminal, the intermediate device firstly acquires the feature information of the IoT terminal, and then determines whether the feature information of the IoT terminal satisfies the preset condition related to the IoT terminal, so as to decide, according to the determination, whether the IoT terminal accesses the IoT platform through the intermediate device. In this way, according to the determination, the IoT platform can be accessed selectively through the intermediate device to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

In the technical solution of the present disclosure, by acquiring the feature information of at least one of the IoT terminal or the intermediate device, it is determined whether the acquired feature information satisfies a preset condition, so as to decide, according to the determination, whether the IoT terminal accesses the IoT platform through the intermediate device. In this way, according to the determination, the IoT platform can be accessed selectively through the intermediate device to avoid a communication problem caused by accessing an intermediate device having insufficient power amount, insufficient traffic, weak signal strength, a long distance, insufficient storage space, insufficient processing capability, slow signal transmission, or unstable signal transmission, or to avoid a problem of increased power consumption and an affected communication caused by the IoT terminal accessing the IoT platform through the intermediate device in the case that the IoT terminal has insufficient power amount, or to avoid a problem in communication between the IoT terminal having a weak signal strength and the intermediate device, thereby improving the reliability of the IoT terminal accessing the IoT platform.

Those skilled in the art can understand that the steps, measures, solutions in the various operations, methods, and flowcharts discussed in the present disclosure may be alternated, modified, combined, or deleted. Furthermore, other steps, measures, solutions in the various operations, methods, and flowcharts discussed in the present disclosure may be alternated, modified, combined, or decomposed, combined, or deleted. Furthermore, other steps, measures, solutions in the various operations, methods, and flowcharts in the prior art and discussed in the present disclosure may be alternated, modified, combined, or decomposed, combined, or deleted.

It should be understood by those of ordinary skill in the art that the discussion of any of the above embodiments is merely exemplary and is not intended to suggest that the scope of the disclosure (including the claims) is limited to these examples. Under the concept of the present disclosure, the technical features in each of the above embodiments can be combined or the technical features of different embodiments can also be combined, the steps can be carried out in any order, and there are many other variations of the various aspects of the present disclosure as described above, which are not provided in detail for the sake of brevity. Within spirit and principles of the present disclosure, any omissions, modifications, equivalent replacements, improvements or the like shall be contained in the protection scope of this disclosure.

What is claimed is:

1. A method of an Internet of Things (IoT) terminal accessing an IoT platform, comprising:
   acquiring feature information of at least one of the IoT terminal or an intermediate device;
   determining whether the acquired feature information satisfies a preset condition;
   in response to determining that the acquired feature information satisfies the preset condition, allowing the IoT terminal to access the IoT platform through the intermediate device; and
   in response to determining that the acquired feature information does not satisfy the preset condition, not allowing the IoT terminal to access the IoT platform through the intermediate device.

2. The method according to claim 1, wherein the feature information comprises at least one of:
   power amount information, traffic information, signal strength information, location information, storage space information, processing capability information, signal transmission rate information, or signal transmission stability information.

3. The method according to claim 1, wherein acquiring the feature information of at least one of the IoT terminal or the intermediate device and determining whether the acquired feature information satisfies the preset condition comprises:
   acquiring, by the IoT terminal, the feature information of the intermediate device; and
   determining, by the IoT terminal, whether the feature information of the intermediate device satisfies the preset condition related to the intermediate device.

4. The method according to claim 1, wherein acquiring the feature information of at least one of the IoT terminal or the intermediate device and determining whether the acquired feature information satisfies the preset condition comprises:
   acquiring, by the IoT terminal, the feature information of the IoT terminal and the feature information of the intermediate device; and
   determining, by the IoT terminal, whether the feature information of the intermediate device satisfies the preset condition related to the intermediate device, and whether the feature information of the IoT terminal satisfies the preset condition related to the IoT terminal.

5. The method according to claim 1, wherein acquiring the feature information of at least one of the IoT terminal or the intermediate device and determining whether the acquired feature information satisfies the preset condition comprises:
   acquiring, by the IoT terminal, the feature information of the IoT terminal; and
   determining, by the IoT terminal, whether the feature information of the IoT terminal satisfies the preset condition related to the IoT terminal.

6. The method according to claim 3, wherein, in response to determining that the acquired feature information satisfies the preset condition, allowing the IoT terminal to access the IoT platform through the intermediate device comprises:
   sending, by the IoT terminal, a connection establishment request to the intermediate device; and
   accessing, by the IoT terminal, the IoT platform through the intermediate device after the IoT terminal receives a connection establishment response returned from the intermediate device.

7. The method according to claim 1, wherein acquiring the feature information of at least one of the IoT terminal or the intermediate device and determining whether the acquired feature information satisfies the preset condition comprises:
   acquiring, by the intermediate device, the feature information of the intermediate device; and
   determining, by the intermediate device, whether the feature information of the intermediate device satisfies the preset condition related to the intermediate device.

8. The method according to claim 1, wherein acquiring the feature information of at least one of the IoT terminal or the intermediate device and determining whether the acquired feature information satisfies the preset condition comprises:
   acquiring, by the intermediate device, the feature information of the intermediate device and the feature information of the IoT terminal; and
   determining, by the intermediate device, whether the feature information of the intermediate device satisfies the preset condition related to the intermediate device, and whether the feature information of the IoT terminal satisfies the preset condition related to the IoT terminal.

9. The method according to claim 1, wherein acquiring the feature information of at least one of the IoT terminal or the intermediate device and determining whether the acquired feature information satisfies the preset condition comprises:
   acquiring, by the intermediate device, the feature information of the IoT terminal; and
   determining, by the intermediate device, whether the feature information of the IoT terminal satisfies the preset condition related to the IoT terminal.

10. The method according to claim 7, wherein, in response to determining that the acquired feature information satisfies the preset condition, allowing the IoT terminal to access the IoT platform through the intermediate device comprises:
    accepting, by the intermediate device, a connection establishment request sent from the IoT terminal and returning a connection establishment response; and
    accessing, by the IoT terminal, the IoT platform through the intermediate device.

11. An Internet of Things (IoT) terminal, comprising:
    a feature information acquisition circuit configured to acquire feature information of at least one of the IoT terminal or an intermediate device;
    a condition determination circuit configured to determine whether the acquired feature information satisfies a preset condition; and an access circuit configured to access an IoT platform through the intermediate device in response to the condition determination circuit determining that the acquired feature information satisfies the preset condition, and access the IoT platform directly rather than through the intermediate device in response to the condition determination circuit determining that the acquired feature information does not satisfy the preset condition.

12. The IoT terminal according to claim 11, wherein
the feature information acquisition circuit is configured to acquire the feature information of the intermediate device; and
the condition determination circuit is configured to determine whether the feature information of the intermediate device satisfies the preset condition related to the intermediate device.

13. The IoT terminal according to claim 11, wherein
the feature information acquisition circuit is configured to acquire the feature information of the IoT terminal; and
the condition determination circuit is configured to determine whether the feature information of the IoT terminal satisfies the preset condition related to the IoT terminal.

14. The IoT terminal according to claim 11, wherein
the feature information acquisition circuit is configured to acquire the feature information of the intermediate device and the feature information of the IoT terminal; and
the condition determination circuit is configured to determine whether the feature information of the intermediate device satisfies the preset condition related to the intermediate device, and whether the feature information of the IoT terminal satisfies the preset condition related to the IoT terminal.

15. An intermediate device, comprising:
a feature information acquisition circuit configured to acquire feature information of at least one of the intermediate device or an Internet of Things (IoT) terminal after receiving a connection establishment request sent by the IoT terminal;
a condition determination circuit configured to determine whether the acquired feature information satisfies a preset condition; and
a connection request response circuit configured to return a connection establishment response allowing the IoT terminal to access an IoT platform through the intermediate device in response to that the condition determination circuit determining that the acquired feature information satisfies the preset condition, and returning a connection failure response not allowing the IoT terminal to access the IoT platform through the intermediate device in response to the condition determination circuit determining that the acquired feature information does not satisfy the preset condition.

16. The intermediate device according to claim 15, wherein
the feature information acquisition circuit is configured to acquire the feature information of the intermediate device; and
the condition determination circuit is configured to determine whether the feature information of the intermediate device satisfies the preset condition related to the intermediate device.

17. The intermediate device according to claim 15, wherein
the feature information acquisition circuit is configured to acquire the feature information of the IoT terminal; and
the condition determination circuit is configured to determine whether the feature information of the IoT terminal satisfies the preset condition related to the IoT terminal.

18. The intermediate device according to claim 15, wherein
the feature information acquisition circuit is configured to acquire the feature information of the intermediate device and the feature information of the IoT terminal; and
the condition determination circuit is configured to determine whether the feature information of the intermediate device satisfies the preset condition related to the intermediate device, and whether the feature information of the IoT terminal satisfies the preset condition related to the IoT terminal.

19. A non-transitory computer-readable storage medium on which a computer program is stored, the computer program, when executed by a computer, causes the computer to implement the method according to claim 1.

* * * * *

UNITED STATES PATENT AND TRADEMARK OFFICE
CERTIFICATE OF CORRECTION

| | |
|---|---|
| PATENT NO. | : 11,184,441 B2 |
| APPLICATION NO. | : 16/494975 |
| DATED | : November 23, 2021 |
| INVENTOR(S) | : Zhao |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 31 days.

Signed and Sealed this
Seventh Day of February, 2023

Katherine Kelly Vidal
*Director of the United States Patent and Trademark Office*